(12) United States Patent
Gracie

(10) Patent No.: US 12,582,177 B2
(45) Date of Patent: Mar. 24, 2026

(54) GLOVE, KIT AND METHOD FOR TRIMMING RESINOUS PLANTS

(71) Applicant: Keila Gracie, Bolinas, CA (US)

(72) Inventor: Keila Gracie, Bolinas, CA (US)

(73) Assignee: Keila Gracie, Bolinas, CA (US)

( * ) Notice: Subject to any disclaimer, the term of this patent is extended or adjusted under 35 U.S.C. 154(b) by 1035 days.

(21) Appl. No.: 15/430,247

(22) Filed: Feb. 10, 2017

(65) Prior Publication Data

US 2018/0229275 A1 Aug. 16, 2018

(51) Int. Cl.
| | |
|---|---|
| *A41D 19/00* | (2006.01) |
| *A01G 22/00* | (2018.01) |
| *A41D 13/08* | (2006.01) |
| *B08B 1/10* | (2024.01) |
| *B08B 1/14* | (2024.01) |

(52) U.S. Cl.
CPC ........... *A41D 13/082* (2013.01); *A01G 22/00* (2018.02); *A41D 13/087* (2013.01); *A41D 19/0013* (2013.01); *B08B 1/10* (2024.01); *B08B 1/14* (2024.01); *B08B 1/143* (2024.01); *A41D 2600/20* (2013.01)

(58) Field of Classification Search
CPC .... A01G 22/00; A41D 13/082; A41D 13/087; A41D 19/0013; A41D 2600/20; B08B 1/00
See application file for complete search history.

(56) References Cited

U.S. PATENT DOCUMENTS

| | | | | |
|---|---|---|---|---|
| 1,783,788 | A | * | 12/1930 | Hatchett, Sr. ............ A46B 5/04 15/160 |
| 2,975,429 | A | * | 3/1961 | Newman .............. A63B 71/146 2/161.2 |
| 3,511,608 | A | * | 5/1970 | Anderson .............. G01N 31/22 422/421 |
| 3,593,339 | A | * | 7/1971 | Main .................... A41D 13/087 2/161.6 |
| 3,643,386 | A | * | 2/1972 | Grzyll ................ A41D 19/0055 451/523 |
| 3,819,390 | A | * | 6/1974 | Teng ........................ C02F 1/681 106/122 |
| 4,519,097 | A | * | 5/1985 | Chappell, Jr. ........ A41D 19/015 2/159 |
| 4,593,427 | A | * | 6/1986 | Ortolivo ................. A47L 13/19 15/104.94 |
| 4,704,743 | A | * | 11/1987 | Thornell ............ A41D 19/0013 2/161.1 |
| 4,882,787 | A | * | 11/1989 | Hull .................... A63B 71/146 2/161.5 |
| 4,894,866 | A | * | 1/1990 | Walker ............. A41D 19/01547 2/159 |
| 6,018,837 | A | * | 2/2000 | Andreu .................... A47K 7/02 15/104.94 |
| 6,209,137 | B1 | * | 4/2001 | Wallick ................ A41D 13/087 2/159 |
| 6,225,271 | B1 | * | 5/2001 | Wright, Jr. ........... C10M 105/00 510/190 |

(Continued)

*Primary Examiner* — Richale L Quinn
(74) *Attorney, Agent, or Firm* — Keila Grace

(57) ABSTRACT

A work glove and method for trimming resinous plants is described. The invention can increase productivity, improve quality, and reduce mess in the work station. A kit containing the work glove and complementary cleaning solution is also described.

20 Claims, 5 Drawing Sheets

(56)            References Cited

U.S. PATENT DOCUMENTS

| 7,086,094 | B1 * | 8/2006 | Ismailyan | A41D 19/01594 |
| | | | | 2/159 |
| D581,100 | S * | 11/2008 | Stalter | D29/113 |
| D595,929 | S * | 7/2009 | Brown | D2/617 |
| 7,895,671 | B2 * | 3/2011 | Salomon | A41D 13/087 |
| | | | | 2/161.2 |
| D701,650 | S * | 3/2014 | McKee | D29/117.1 |
| D829,408 | S * | 10/2018 | Selbiger | D2/618 |
| 2003/0213081 | A1 * | 11/2003 | Garcia | B43K 23/016 |
| | | | | 15/227 |
| 2004/0031120 | A1 * | 2/2004 | Cherian | A41D 19/0024 |
| | | | | 15/227 |
| 2005/0060786 | A1 * | 3/2005 | Ran | A41D 19/01594 |
| | | | | 2/161.6 |
| 2005/0229284 | A1 * | 10/2005 | Gaetz | A41D 19/01594 |
| | | | | 2/159 |
| 2007/0025797 | A1 * | 2/2007 | Keck | A45D 34/04 |
| | | | | 401/7 |
| 2009/0144880 | A1 * | 6/2009 | Desjardin | A63B 71/146 |
| | | | | 2/161.1 |
| 2011/0004974 | A1 * | 1/2011 | Firouzman | A47L 13/12 |
| | | | | 2/161.8 |
| 2012/0090121 | A1 * | 4/2012 | Phillips, Sr. | A47L 13/18 |
| | | | | 15/210.1 |
| 2012/0117703 | A1 * | 5/2012 | Jaramillo | A63B 71/143 |
| | | | | 2/19 |
| 2012/0311804 | A1 * | 12/2012 | Leis | A47L 13/18 |
| | | | | 15/227 |
| 2014/0352030 | A1 * | 12/2014 | Holland | A41D 19/0024 |
| | | | | 2/160 |
| 2016/0113472 | A1 * | 4/2016 | Redd | A47L 13/12 |
| | | | | 15/118 |
| 2017/0127737 | A1 * | 5/2017 | Perryman | A41D 19/01576 |
| 2017/0231304 | A1 * | 8/2017 | Provencher | A41D 19/0024 |
| | | | | 2/162 |
| 2018/0042316 | A1 * | 2/2018 | Wiseman | A41D 19/0037 |
| 2018/0093083 | A1 * | 4/2018 | Headington | A61M 35/006 |
| 2018/0296058 | A1 * | 10/2018 | Firouzman | A47L 13/18 |

* cited by examiner

GLOVE, KIT AND METHOD FOR TRIMMING RESINOUS PLANTS

BACKGROUND OF THE INVENTION

In modern horticulture there is often a need to conduct careful trimming of resinous plants, especially the resinous buds. A problem that is encountered is that the bladed trimmers that are used to trim the buds frequently become gummed up with the plant resin. Conventionally, this problem has been addressed by soaking the trimming tool in a container of cleaning fluid (the container may be shared among several workers) and after a while the tool is removed and wiped with a cloth rag or even burned, taking a long time to get the trimmer back to work. Sometimes, the container is overturned, making a mess on a working table. Working in groups, another worker may pick any trimmer out of the common container and the worker may lose use of her favorite tool. Of course, plant resin on a blade may can break the blade and a resinous blade will reduce production and quality of the work. This combination of problems is unique to this sub-field of horticulture. The invention described below was made in order to solve this combination of problems specifically for the trimming of resinous plants.

SUMMARY OF THE INVENTION

I have discovered that the problems encountered during the trimming of resinous plants can be solved by use of the inventions that are described below.

In a first aspect, the invention comprises a glove for trimming resinous plants, comprising: a wrist cover adapted to surround the wrist and is attached to a hand and finger cover; wherein the hand and finger cover is adapted to fit over the pinkie finger and ring finger of the wearer; and an absorbent pad that is attached to the side of the glove that is adapted to be worn over the palm. The pad is a material that is different than the glove material that is adapted to overlie the palm. Alternatively, the pad can be made of the same material as the glove material but, in this case, the pad has a thickness at least as great as the glove material so that the combined thickness of pad and glove is at least twice that of the glove alone. The glove is configured to cover at most 3 fingers so that, when worn, the index finger is free from the glove.

In another aspect, the invention provides a plant-trimming kit, comprising: a glove for trimming resinous plants, comprising: a wrist cover adapted to surround the wrist and is attached to a hand and finger cover; wherein the hand and finger cover is adapted to fit over the pinkie finger and ring finger of the wearer; and an absorbent pad that is attached to the side of the glove that is adapted to be worn over the palm; wherein the pad is a material that is different than the glove material that is adapted to overlie the palm, or wherein the pad is the made of the same material as the glove material but has a thickness at least as great as the glove material so that the combined thickness of pad and glove is at least twice that of the glove alone. The kit further includes a bottle comprising a mixture of alcohol and oil.

The invention also includes a method of trimming resinous plants, comprising: wearing a glove; wherein the glove comprises a wrist cover adapted to surround the wrist and is attached to a hand and finger cover; wherein the hand and finger cover is adapted to fit over the pinkie finger and ring finger of the wearer; and an absorbent pad that is attached to the side of the glove that is adapted to be worn over the palm; wherein the pad is a material that is different than the glove material that is adapted to overlie the palm, or wherein the pad is the made of the same material as the glove material but has a thickness at least as great as the glove material so that the combined thickness of pad and glove is at least twice that of the glove alone; and wherein the pad comprises a mixture of alcohol and oil. The worker holds a bladed trimmer in the gloved hand and uses the trimmer in the gloved hand to cut plant material from a resinous plant that causes resin to collect on at least one blade of the bladed trimmer. The worker then wipes the at least one blade on the pad to remove resin and thus provide a cleaned bladed trimmer; and then uses the cleaned trimmer to again cut plant material from a resinous plant.

DETAILED DESCRIPTION OF THE INVENTION

Figure 1:
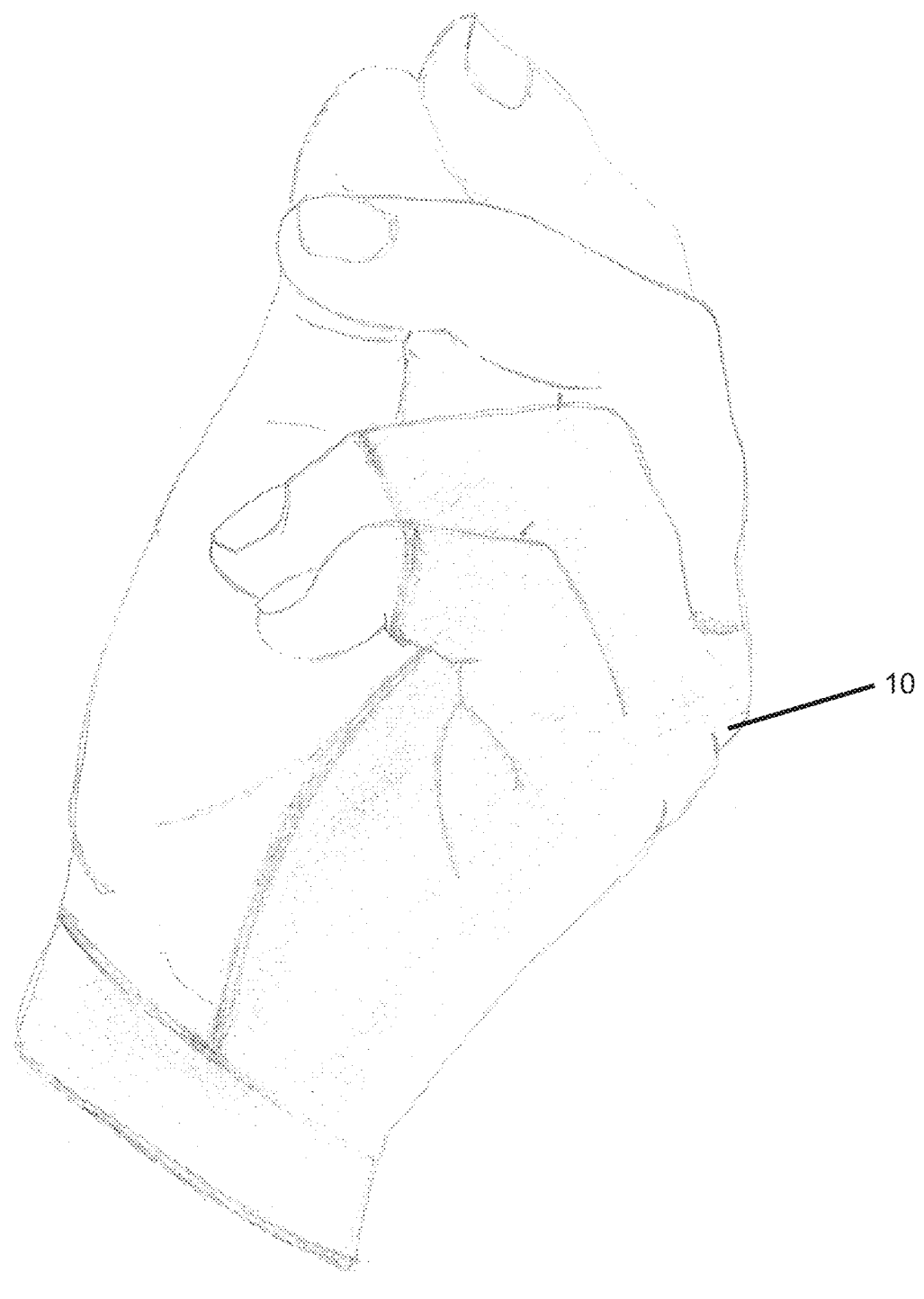
FIG. 1 illustrates a glove worn on a hand according to the present invention.
Figure 2:
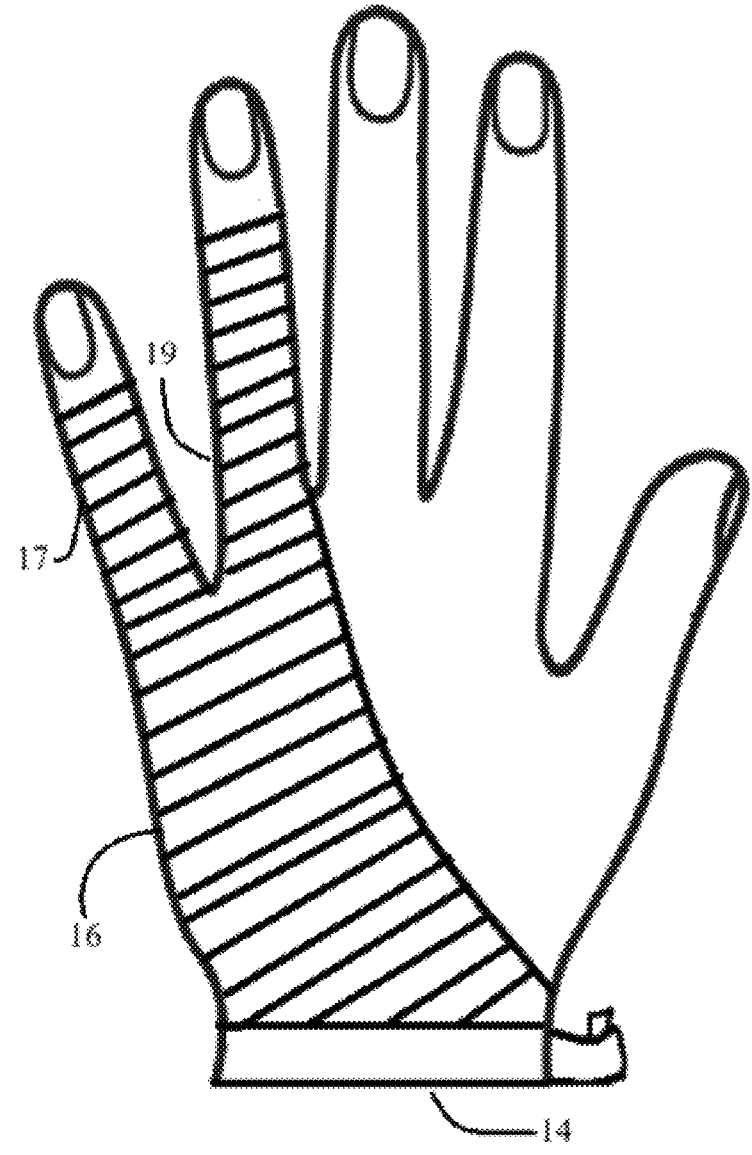
FIG. 2 illustrates a glove worn on a hand viewed from the back of the hand.
Figure 3:
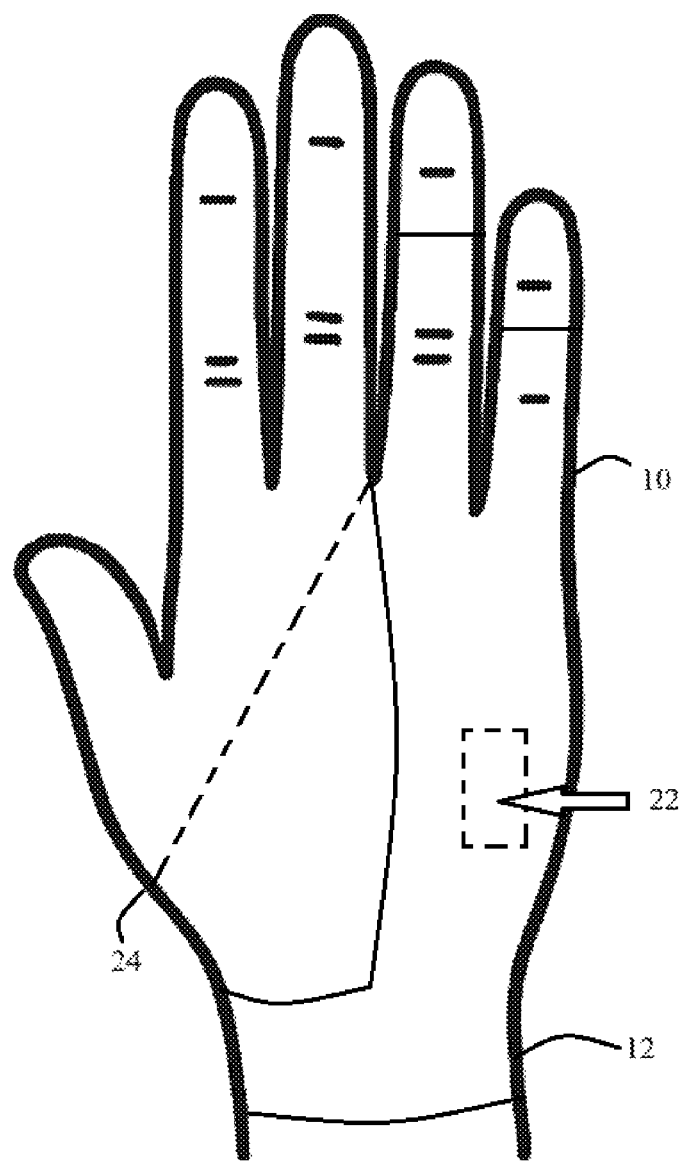
FIG. 3 illustrates a glove including a pad located on the palm-side of the glove.
Figure 4:
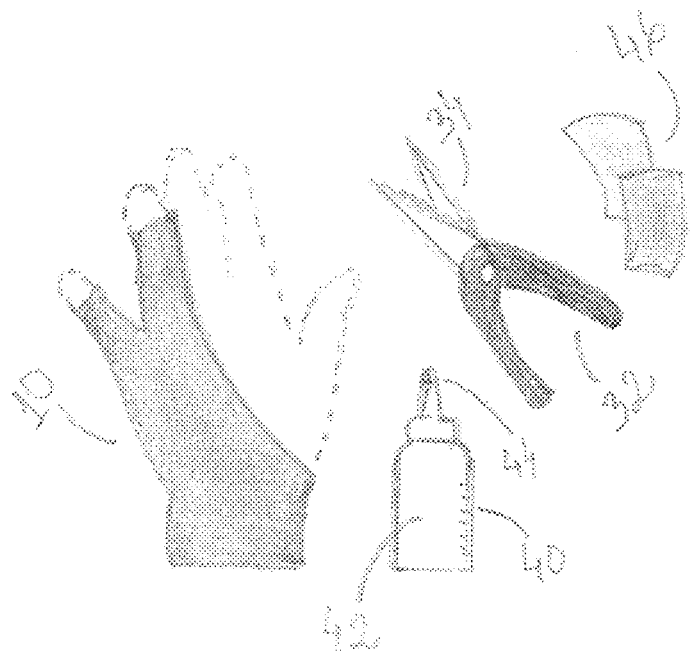
FIG. 4 illustrates a kit containing the trim glove, cleaning solution, and optional trimmer.
Figure 5:
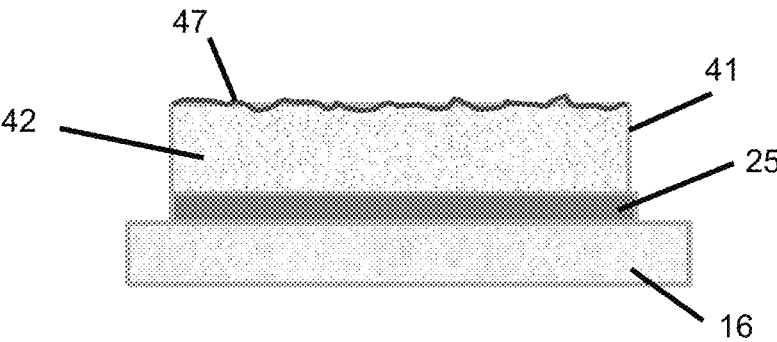
FIG. 5 illustrates a cross-section of the padded section of the glove.

FIG. 1 shows one embodiment of a trimming glove 10 according to the invention. There is a wrist band 12 that fits over the wrist of the wearer. Preferably, the wrist band helps keep the glove in place and may include a fastener such as a hook and loop (i.e., Velcro™) fastener, buckle, clasp, adhesive tape, etc. The wrist band could be a leather wrist strap. Optionally, the back of the wrist band could have a strip of industrial diamond or other sharpening material strip. Although it is possible to put a wipe or sponge on the back of the glove, I have discovered that placement of the absorbent pad on the palm of the glove provides superior results in both the speed and function of the cleaning trimmer blades in the process of trimming resinous plants. The wrist band attaches to the fabric that forms the body 16 of the glove.

The body 16 of the glove extends over the palm and covers at least two fingers (the pinky 17 and ring finger 19). The body of the glove covers the base of these fingers (i.e., the webbing on both sides of the ring finger and all around the base of the pinky finger); this is necessary for anchoring the pad. In the illustrated embodiment, the glove body has finger sleeves 17, 19 that cover the knuckles while leaving the fingertips exposed. Alternatively, the finger sleeves may cover the finger tips. In some preferred embodiments, the glove is configured to leave the thumb, middle finger, and index finger exposed; this configuration is especially useful since these digits can control a trimmer. In some other embodiments, finger sleeves are provided for the middle and/or index fingers. In less preferred embodiments, the thumb may also be covered. As with the other finger sleeves, sleeves over the other digits may be complete, or more preferably, partial coverings leaving the fingertips exposed. A latex or nitrile glove may be worn under the inventive glove as additional protection. In another alternative, more of the palm can be covered by extending the material in a larger area such as illustrated by dotted line 24.

The body 16 can be made of a single material or combination of materials. Typically, between about 10 to 90%, more preferably 25 to 75% of the area of the palm is exposed. Preferred materials for the glove body 16 include: cotton, cotton fleece, cotton blend t-shirt grade, bamboo fleece, denim, flannel, Kashmir, leather, Spandex™, hemp, mesh, polyester microfiber, terry cloth, and chamois; and combinations thereof.

The back of the glove may carry a logo. The glove can be made for the right hand or the left hand, the left hand will be a mirror image of the right hand. Sizes in small, medium, and large. Colors, decorative notions, brand logo placement can be varied for creative purposes of marketing.

Cleaning pad 22 is affixed to the palm of the glove. The cleaning pad may be made of any of the materials mentioned above as well as other absorbent materials such as non woven fibers (such as felt), and sponge. The cleaning pad may also be made a several materials such as an interior absorbent material 41 (such as a sponge) and porous covering 47. The porous covering, when present, is typically more abrasive and tougher than the absorbent material and can be a scrub surface comprising metal strands or hard polymeric strands. For purposes of the present invention, the "absorbent material" must be a material that absorbs the cleaning solution. Thus, in preferred embodiments, the absorbent material is a lipophilic (typically hydrophobic) material that absorbs oil.

The absorbent pad can be affixed to the glove by permanent methods such as sewing and irreversible gluing. In some preferred embodiments, the pad is held in place by removable adhesive (selected to effectively anchor the pad but which can be peeled off by hand or with pliers) that permits removal and replacement with a new pad. Another way to temporarily affix a pad is with hook and loop type fasteners. In some preferred embodiments, a nonporous layer 25 is disposed between the absorbent material and the glove body; this reduces the seepage of cleaning solution through the glove.

During use, the pad 22 contains cleaning fluid 42. The fluid may be any fluid that is useful for removing resin from metal surfaces. I have found that a mixture of alcohol (preferably ethyl or isopropyl or a mixture of the two; due to their low toxicity, high volatility and low odor) and oil is a superior mixture for cleaning plant resin from trimmer blades. In some preferred embodiments, the cleaning solution does not contain soap or noxious or toxic cleaning agents such as bleach; and may consist essentially of alcohol and oil. The oil should be nontoxic and is preferably a vegetable oil such as canola oil or the like. The cleaning mixture may comprise from 10 to 90% or 20 to 80%, or 40 to 60% oil and 10 to 90% or 20 to 80%, or 40 to 60% alcohol (single alcohol or mixture) with the sum of alcohol and oil being, of course, no more than 100% (with all % referred to mass %). The invention may also include a method of optimizing cleaning fluid in which the user prepares mixtures of 1:2, 1:1, and 2:1 (by volume) mixtures of alcohol and oil and tests them in the field to see which mixture performs best for the resin conditions on that day. Separate oil and alcohol containers and small transparent or translucent containers with marked levels may be provided in a kit for preparing the mixtures of appropriate volumes which are combined in a bottle 40 for squirting, pouring or dropping the cleaning solution on the pad. Since alcohol is more volatile than oil, the method of trimming could be conducted with a first cleaning solution having a first ratio of alcohol to oil that is later supplemented with a second solution of alcohol or a second ratio of alcohol to oil that is higher than the first ratio.

The invention also includes a kit containing the trim glove 10 and a bottle 40 with cleaning solution. This bottle typically includes a screw or snap cap 44. The kit may also include a trim tool 32 with trim blade 34. In addition, or alternatively to a trimmer and/or cleaning solution, the kit may include replacement pads 46. The replacement pads can be sold pre-soaked with cleaning solution. The various items in the kit can be enclosed in a transparent plastic display package or other suitable container.

Optionally, the glove may be sold with a variety pack of wiping materials designed for specific varieties of resinous plants.

For applications in which the resin has medicinal or other useful properties, the used pad can be removed and the resin extracted. Alternatively, where the resin has use as incense, for example, the resin-soaked pad could be shaped into an appropriate form and saved or sold for use; in this application, the pad is desirably made of a natural and nontoxic plant material such as hemp.

The invention also includes a method of trimming resinous plants. In this method, a worker wears the glove of the type described above. The worker puts on the glove and then holds a trimmer to trim the resinous plant material. A worker may use both right and left gloves although in many cases only one trim glove is worn. The exposed thumb and index finger or index and middle fingers allow for fine control of the trimmer and/or plant material. For example, a delicate resinous bud or flower can be twirled in the fingers and thumb for fine control. The pad 22 is soaked with a cleaning solution. Periodically, the trimmer blade 34 is rubbed against the pad to remove resin and then the worker resumes the trimming operation. Trimming refers to the cutting of resinous plant material.

The invention is specifically directed to the trimming of resinous plants but is applicable to a wide variety of resinous plants including but not limited to: maple, sweetgum, creosote bush, aspen, willow, birch, gardenia, quinine, coffee, morning glory, fennel, caraway, sarsaparilla, *Dictamnus fraxinella, ginseng,* balsam root, sunflower, lotus, hops (*Humulus lupulus*), cedar, juniper, spruce, yew, larch, pine, and fir. The method is useful in wreath-making, flower arranging, or a wide variety of horticultural uses.

What is claimed:

1. A glove for trimming resinous plants, comprising:
a wrist cover adapted to surround a wrist and is attached to a hand and finger cover;
wherein the hand and finger cover is adapted to fit over a pinkie finger and ring finger of a wearer; and
an absorbent pad that is attached to a side of the glove that is adapted to be worn over a palm;
wherein the absorbent pad is a material that is different than the glove material that is adapted to overlie the palm wherein the absorbent pad comprises an interior absorbent material that can absorb oil and a porous covering over the interior absorbent material; wherein the porous covering is more abrasive that the interior absorbent material and wherein the porous covering is a scrub surface comprising metal strands or hard polymeric strands; and
wherein the glove is configured to cover at most 3 fingers so that, when worn, an index finger is free from the glove.

2. The glove of claim 1 wherein the finger cover comprises finger sleeves that are adapted to cover the knuckles while leaving the fingertips exposed.

3. The glove of claim 1 configured to leave the thumb, middle finger and index finger exposed.

4. The glove of claim 3 wherein the glove material is adapted to cover 25 to 75% of the area of the palm.

5. The glove of claim 1 wherein the absorbent pad comprises nonwoven fibers or a sponge.

6. The glove of claim 1 wherein the absorbent pad is affixed to the glove by a removable adhesive or by hook and loop fasteners.

7. The glove of claim 1 wherein a nonporous layer is disposed between the glove material and the absorbent pad.

8. The glove of claim 1 wherein absorbent pad comprises a cleaning solution comprising a mixture of alcohol and oil; and wherein the absorbent material is a lipophilic material that absorbs oil.

9. The glove of claim 8 wherein the lipophilic material is hydrophobic.

10. The glove of claim 1 wherein the interior absorbent material is a lipophilic material and wherein the lipophilic material is hydrophobic.

11. A glove for trimming resinous plants, comprising:
a wrist cover adapted to surround a wrist and is attached to a hand and finger cover;
wherein the hand and finger cover is adapted to fit over a pinkie finger and ring finger of a wearer; and
an absorbent pad that is attached to a side of the glove that is adapted to be worn over a palm;
wherein the absorbent pad is a material that is different than a glove material that is adapted to overlie the palm, or wherein the pad is the made of the same material as the glove material but has a thickness at least as great as the glove material so that the combined thickness of pad and glove is at least twice that of the glove alone; and
wherein the glove is configured to cover at most 3 fingers so that, when worn, an index finger is free from the glove; and wherein the absorbent pad comprises a cleaning solution comprising a mixture of alcohol and oil.

12. The glove of claim 11 wherein the cleaning solution consists essentially of alcohol and oil.

13. The glove of claim 11 wherein the cleaning solution comprises 20 to 80% vegetable oil and 20 to 80% alcohol.

14. The glove of claim 13 wherein the alcohol is isopropyl alcohol.

15. The glove of claim 11 wherein a nonporous layer is disposed between the absorbent pad and the glove material.

16. A glove for trimming resinous plants, comprising:
a wrist cover adapted to surround a wrist and is attached to a hand and finger cover;
wherein the hand and finger cover is adapted to fit over a pinkie finger and ring finger of the wearer; and
an absorbent pad attached to a side of the glove that is adapted to be worn over the edge of a palm that is on the side of the pinky finger;
wherein the absorbent pad is a material that is different than a glove material that is adapted to overlie the palm; and
wherein the glove is configured to cover at most 3 fingers so that, when worn, an index finger is free from the glove.

17. The glove of claim 16 wherein the absorbent pad comprises an interior absorbent material that can absorb oil and a porous covering over the interior absorbent material; wherein the porous covering is more abrasive that the interior absorbent material and wherein the porous covering is a scrub surface comprising metal strands or hard polymeric strands.

18. The glove of claim 16 wherein the glove material comprises: cotton, cotton fleece, cotton blend t-shirt grade, bamboo fleece, denim, flannel, kashmir, leather, elastane, hemp, mesh, polyester microfiber, terry cloth, and chamois; and
combinations thereof; and
wherein the glove material is adapted to cover 25 to 75% of the area of the palm.

19. The glove of claim 16 wherein the absorbent material is a lipophilic material that absorbs oil.

20. The glove of claim 19 wherein a nonporous layer is disposed between the absorbent pad and the glove material.

* * * * *